US012351409B2

(12) United States Patent
Mori

(10) Patent No.: US 12,351,409 B2
(45) Date of Patent: Jul. 8, 2025

(54) SHEET FEEDING DEVICE AND IMAGE FORMING SYSTEM

(71) Applicant: CANON KABUSHIKI KAISHA, Tokyo (JP)

(72) Inventor: Eikou Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/413,310

(22) Filed: Jan. 16, 2024

(65) Prior Publication Data

US 2024/0150142 A1 May 9, 2024

Related U.S. Application Data

(62) Division of application No. 17/321,627, filed on May 17, 2021, now Pat. No. 11,912,518.

(30) Foreign Application Priority Data

May 22, 2020 (JP) ................................ 2020-089816

(51) Int. Cl.
*B65H 29/52* (2006.01)
*B65H 1/12* (2006.01)
(Continued)

(52) U.S. Cl.
CPC ............... *B65H 1/12* (2013.01); *B65H 5/062* (2013.01); *G03G 21/1623* (2013.01);
(Continued)

(58) Field of Classification Search
CPC ............ B65H 2402/31; B65H 2402/44; B65H 2402/45; B65H 2801/24; B65H 2801/27;
(Continued)

(56) References Cited

U.S. PATENT DOCUMENTS 5,121,521 A * 6/1992 Hagiwara ................ B41J 29/13 16/374
10,099,891 B2 10/2018 Mizuguchi
(Continued)

FOREIGN PATENT DOCUMENTS

JP 01176747 A * 7/1989
JP 2003-019847 A 1/2003
(Continued)

*Primary Examiner* — Luis A Gonzalez
(74) *Attorney, Agent, or Firm* — Venable LLP

(57) ABSTRACT

A sheet feeding device includes a feeding roller pair, a first guide, a door including a second guide and rotatable between a first direction and a second direction opposite to the first direction through first to third positions, a damping mechanism, and an engaging portion including an elastic member. A first resisting force is set so that moment acting around a shaft by a self-weight of the door is larger than the first resisting force of the damping mechanism when the door is positioned between the second position and the third position. A resultant force of the first resisting force of the damping mechanism and a second resisting force of the elastic portion is set so that the moment acting around the shaft by the self-weight of the door is larger than the resultant force when the door is positioned between the second position and the third position.

6 Claims, 6 Drawing Sheets

(51) Int. Cl.

*B65H 5/06* (2006.01)
*B65H 5/38* (2006.01)
*B65H 29/12* (2006.01)
*G03G 21/16* (2006.01)

(52) U.S. Cl.

CPC ..... *G03G 21/1628* (2013.01); *G03G 21/1633* (2013.01); *B65H 2601/321* (2013.01); *B65H 2801/21* (2013.01); *G03G 2221/1687* (2013.01)

(58) Field of Classification Search

CPC ............ B65H 2801/31; B65H 2601/11; B65H 2601/321; B65H 2402/441; B65H 29/52; B65H 5/38; B65H 2403/60; B65H 2403/61; G03G 21/1623; G03G 21/1628; G03G 21/1633; G03G 21/1638; G03G 2221/1687; G03G 2221/1675

See application file for complete search history.

(56) References Cited

U.S. PATENT DOCUMENTS

| | | | | |
|---|---|---|---|---|
| 2003/0198494 | A1* | 10/2003 | Kenji | B65H 31/24 399/407 |
| 2009/0169249 | A1 | 7/2009 | Watanabe | |
| 2011/0002722 | A1* | 1/2011 | Hirata | G03G 15/6573 399/407 |
| 2011/0293326 | A1* | 12/2011 | Tanabe | G03G 21/1633 399/124 |
| 2016/0159588 | A1 | 6/2016 | Mizuguchi | |
| 2019/0127167 | A1 | 5/2019 | Mori | |
| 2021/0365752 | A1 | 11/2021 | Mori et al. | |
| 2021/0377412 | A1 | 12/2021 | Tokuma et al. | |
| 2021/0377416 | A1 | 12/2021 | Sekigawa et al. | |

FOREIGN PATENT DOCUMENTS

| | | | | | |
|---|---|---|---|---|---|
| JP | 2012123064 | A | * | 6/2012 | |
| JP | 2016-109781 | A | | 6/2016 | |
| KR | 2004021159 | A | * | 3/2004 | G03G 15/6529 |

* cited by examiner

SHEET FEEDING DEVICE AND IMAGE FORMING SYSTEM

This application is a divisional of application Ser. No. 17/321,627 filed May 17, 2021.

FIELD OF THE INVENTION AND RELATED ART

The present invention relates to a sheet feeding device for feeding a hook and an image forming system including the sheet feeding device.

In recent years, an image forming apparatus such as a printer has been required to meet various sheets and to improve productivity in a printing step. Such an image forming apparatus employs metal as a material of a feeding guide for guiding the sheet along a sheet feeding passage in order to meet printing using thick paper with a large basis weight.

Incidentally, in order to remove a jammed sheet, a door provided with the feeding guide is openable (and closable) in general between a position where the sheet is capable of being removed and a position where the sheet is capable of being guided. However, in the case where the material is metal, a weight of the feeding guide itself increases, so that an operating property of the door lowers. In order to solve this problem, in Japanese Laid-Open Patent Application (JP-A) 2003-19847 and JP-A 2016-109781, a constitution in which a damper for damping opening and closing of the door is provided has been disclosed.

In JP-A 2003-19847 and JP-A 2016-109781, when the door is closed from an open state, in the case where a damper resistance is smaller than a self-weight of the door, the door is unintentionally rotated toward a direction in which the door is closed. On the other hand, when the door resistance is excessively larger than the self-weight of the door, there is a need to perform an operation for closing the door by pressing in the door, so that the operating property becomes worse.

SUMMARY OF THE INVENTION

A principal object of the present invention is to provide a sheet feeding device which is provided with a rotatable door and which is capable of compatibly realizing an image in damping property of rotation of the door and an image in operating property of the door.

According to an aspect of the present invention, there is provided a sheet feeding device comprising: a feeding roller pair configured to feed a sheet; a first guide configured to form a feeding passage along which the sheet fed by the feeding roller pair is passed; a door provided with a second guide forming the feeding passage in cooperation with the first guide and configured to be rotatable about a shaft between a closed position and an open position, the closed position being a position where the second guide opposes the first guide and forms the feeding passage, and the open position being a position where the door is rotated in a first direction so that a center of gravity of the door passes through above the shaft with respect to a vertical direction and where the feeding passage is open; a damping mechanism configured to impart a first resisting force to the door when the door is rotated in a second direction opposite to the first direction; and an engaging portion including an elastic member for imparting a second resisting force to the door by being elastically deformed when the door is rotated toward the closed position, the engaging portion being engageable with a portion-to-be-engaged at the closed position, wherein when the door is rotated from the open position to the closed position, the door passes through a first position where the center of gravity passes through above the shaft with respect to the vertical direction, a second position where the center of gravity is positioned on a downstream side of the second direction than the first position is, and a third position where the center of gravity is positioned on a further downstream side of the second direction than the second position is and where the elastic portion starts elastic deformation, wherein the first resisting force is set so that moment acting around the shaft by a self-weight of the door is larger than the first resisting force of the damping mechanism when the door is positioned between the second position and the third position, and wherein a resultant force of the first resisting force of the damping mechanism and the second resisting force of the elastic portion is set so that the moment acting around the shaft by the self-weight of the door is larger than the resultant force when the door is positioned between the second position and the third position.

According to the present invention, it is possible to compatibly realize the image in damping property of the rotation of the door and the image in operating property of the door in the sheet feeding device provided with the rotatable door.

Further features of the present invention will become apparent from the following description of exemplary embodiments with reference to the attached drawings.

Figure 2:
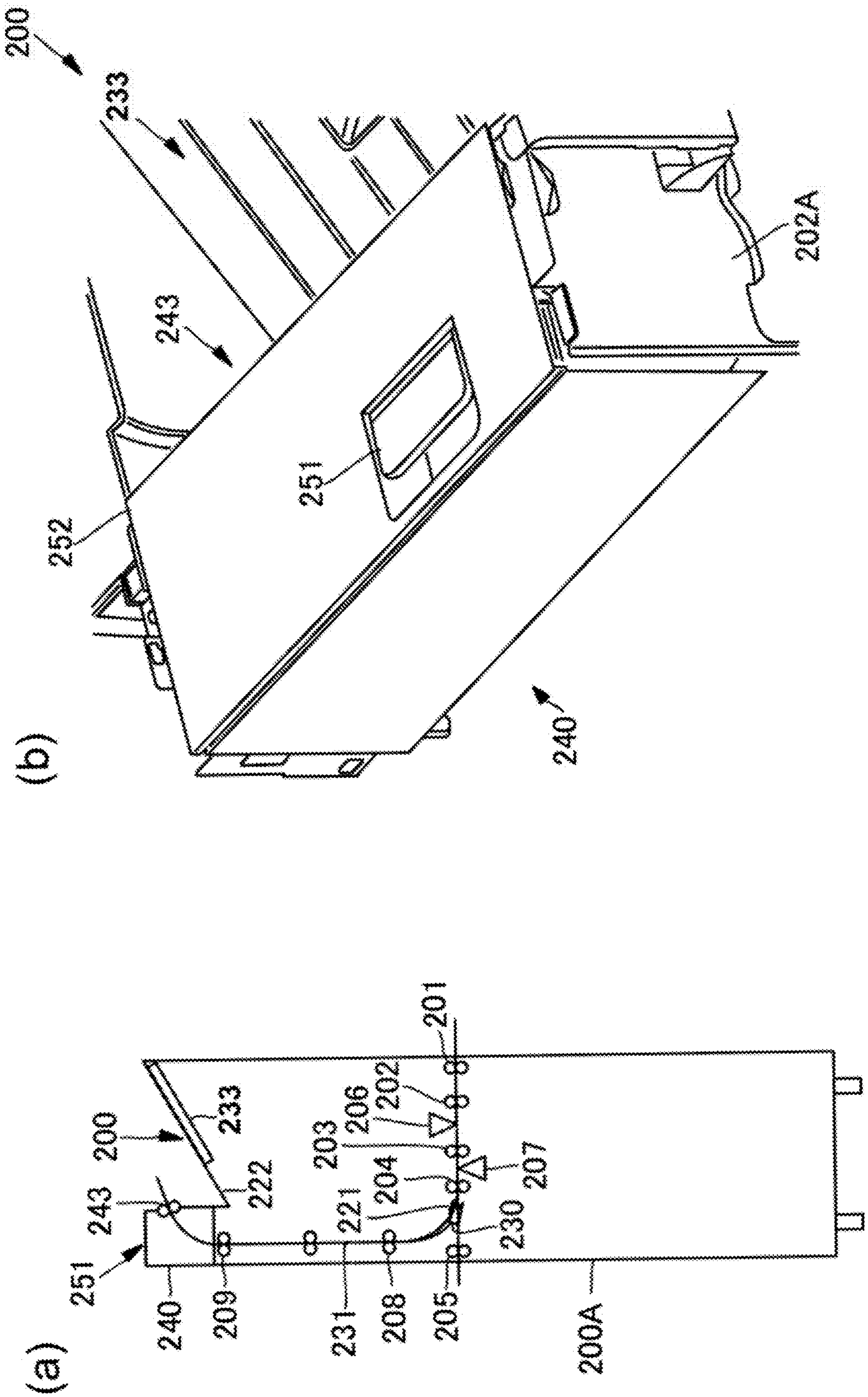

Parts (a) and (b) of FIG. 2 are a sectional view and a perspective view, respectively, showing a general structure of a discharging unit included in an adjusting unit in the embodiment 1.

Figure 3:
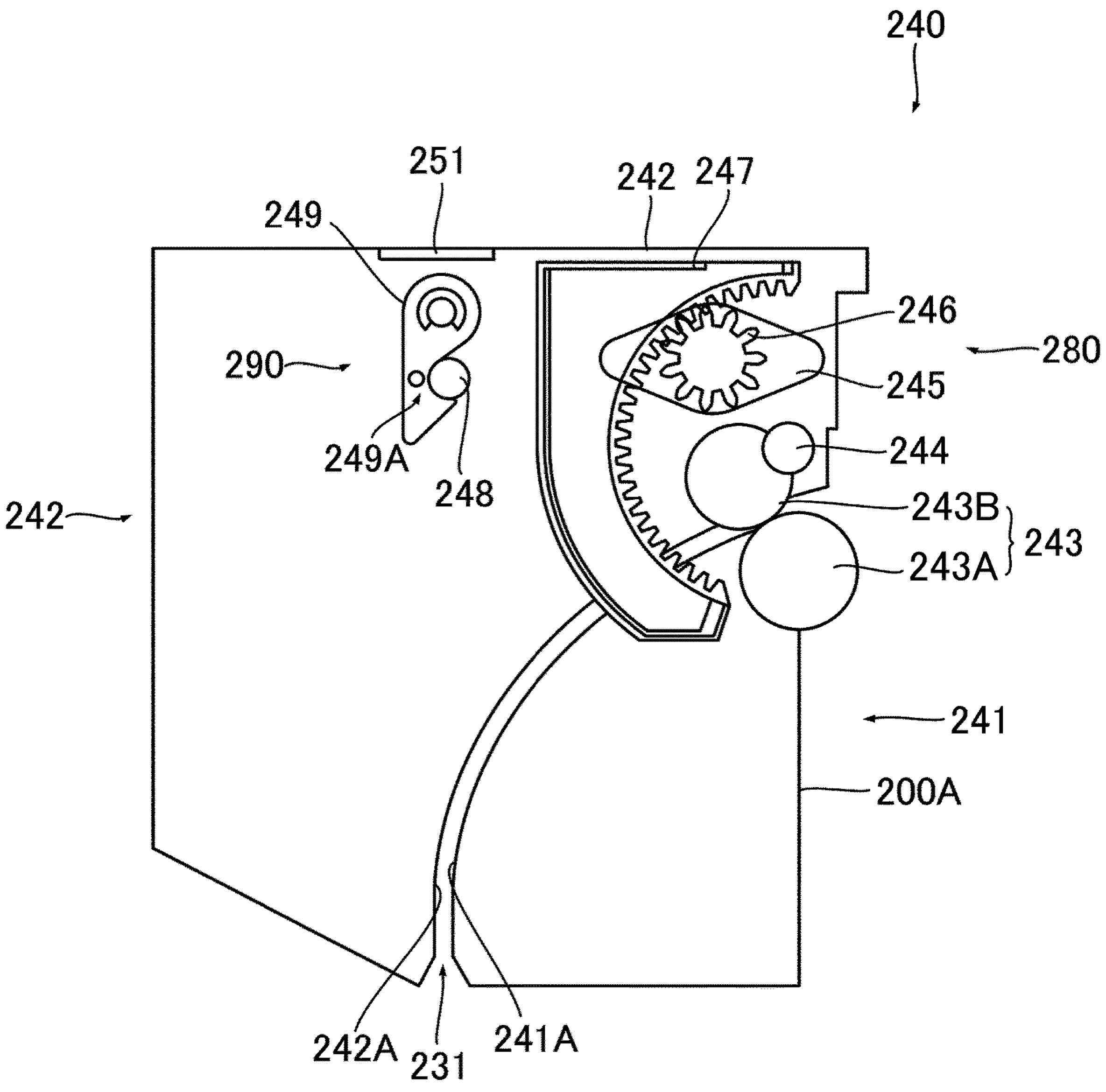

FIG. 3 is a sectional view showing the structure of the discharging unit included in the adjusting unit in the embodiment 1.

Figure 4:
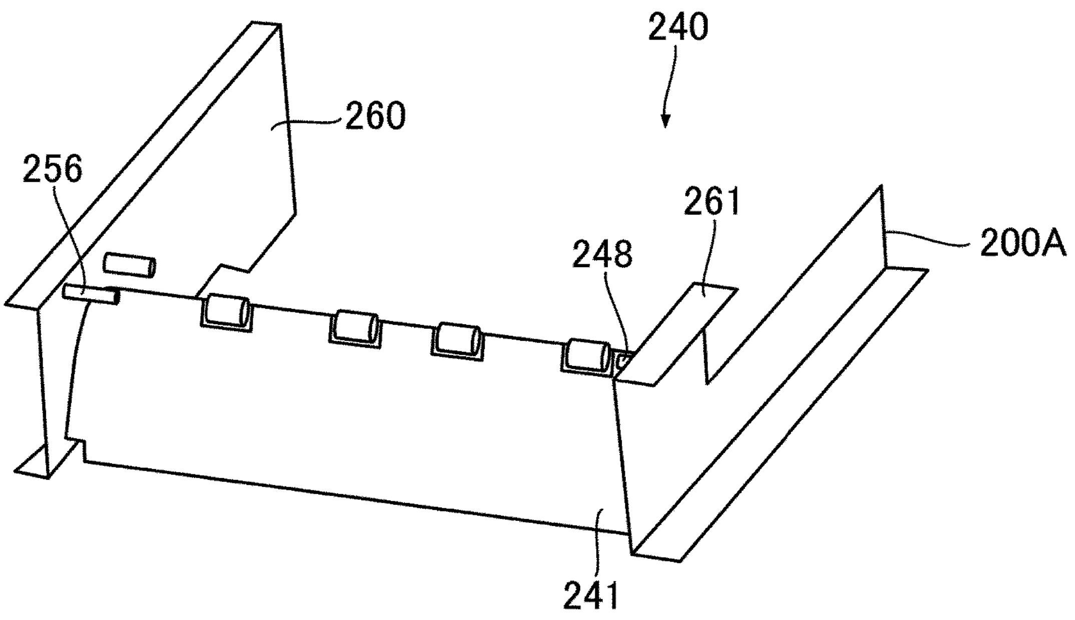

FIG. 4 is a perspective view of the discharging unit in the embodiment 1 as seen from obliquely above.

Figure 5:
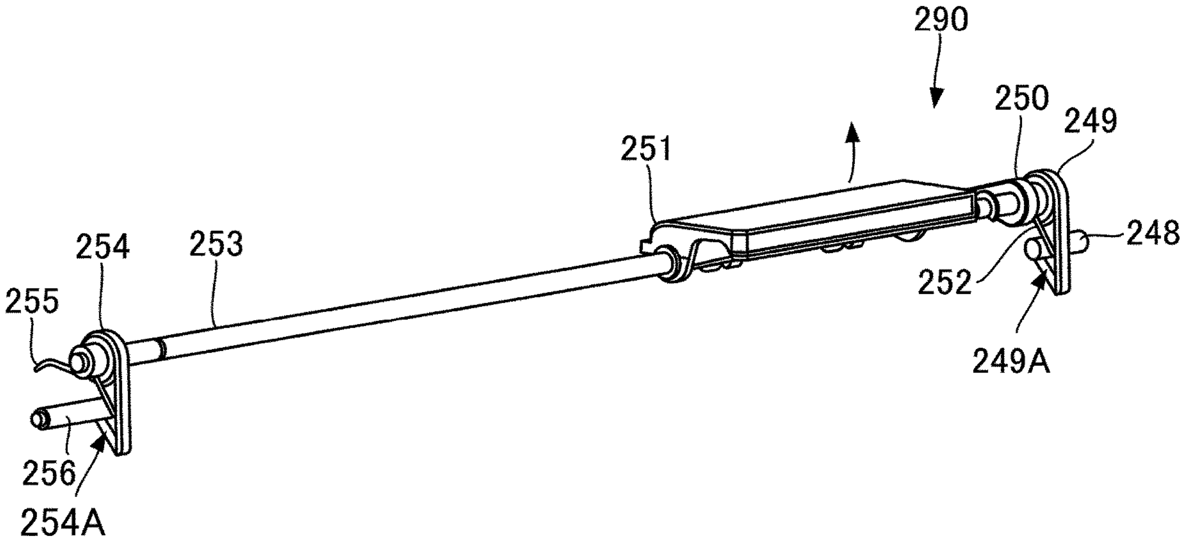

FIG. 5 is a perspective view showing a structure of an engaging means in the embodiment 1.

Figure 6:
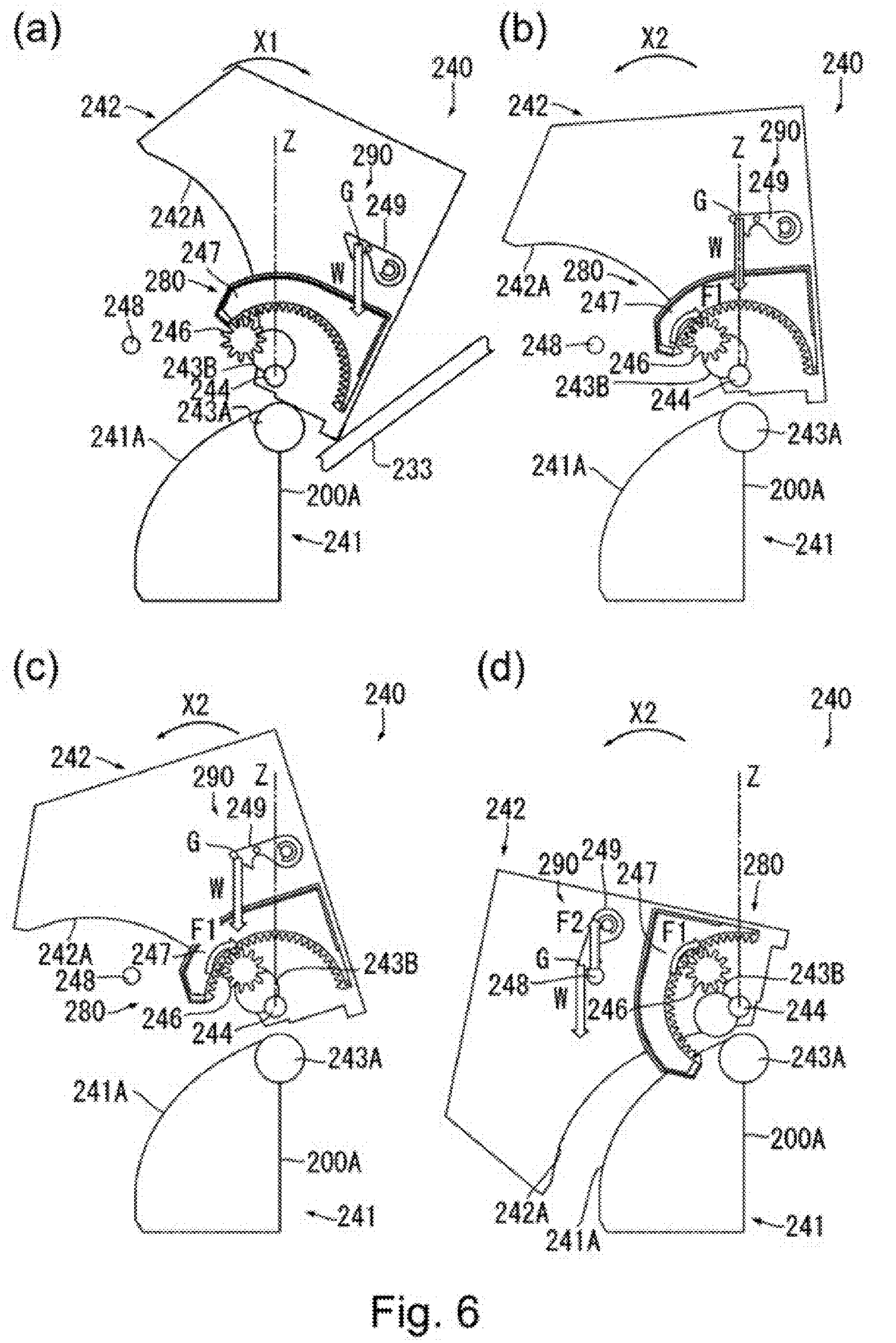

Parts (a) to (d) of FIG. 6 are schematic views for illustrating a relationship between moment acting around a rotation shaft by a self-weight of an upper discharging unit and a resultant force of a damper resistance of a damper unit and a resisting force of an engaging means.

Figure 7:
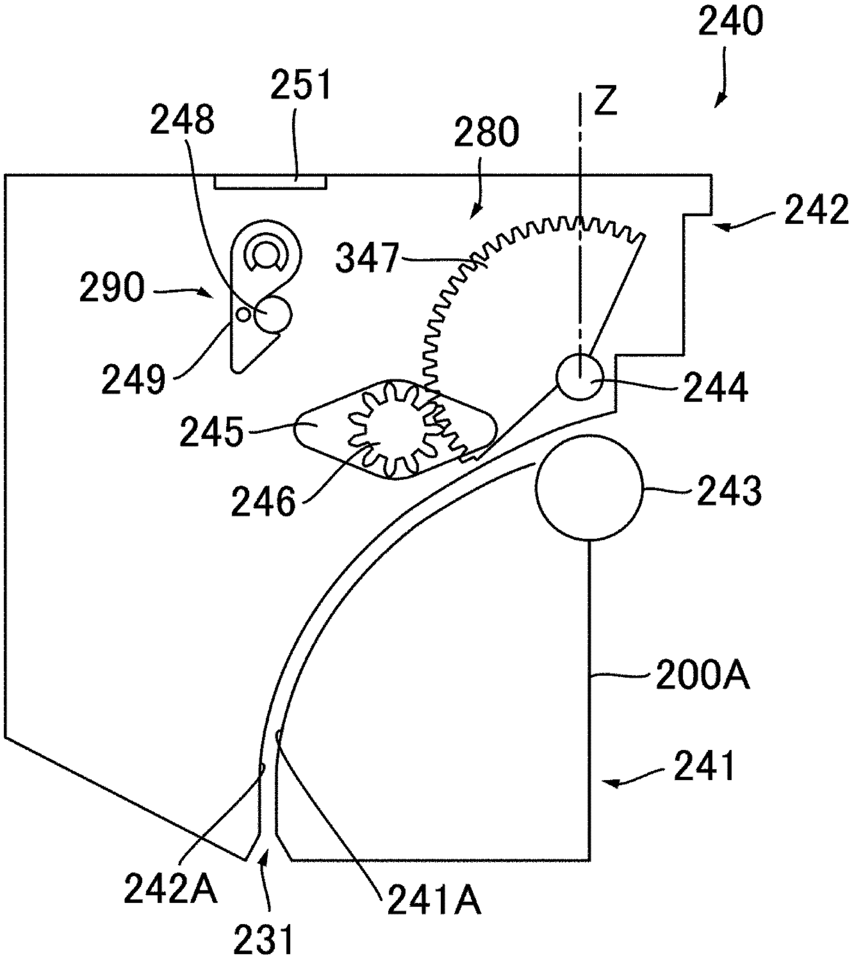

FIG. 7 is a sectional view showing a structure of a discharging unit in an embodiment 2.

DESCRIPTION OF THE EMBODIMENTS

In the following, embodiments for carrying out the present invention will be described with reference to the drawings.

Embodiment 1

Figure 1:
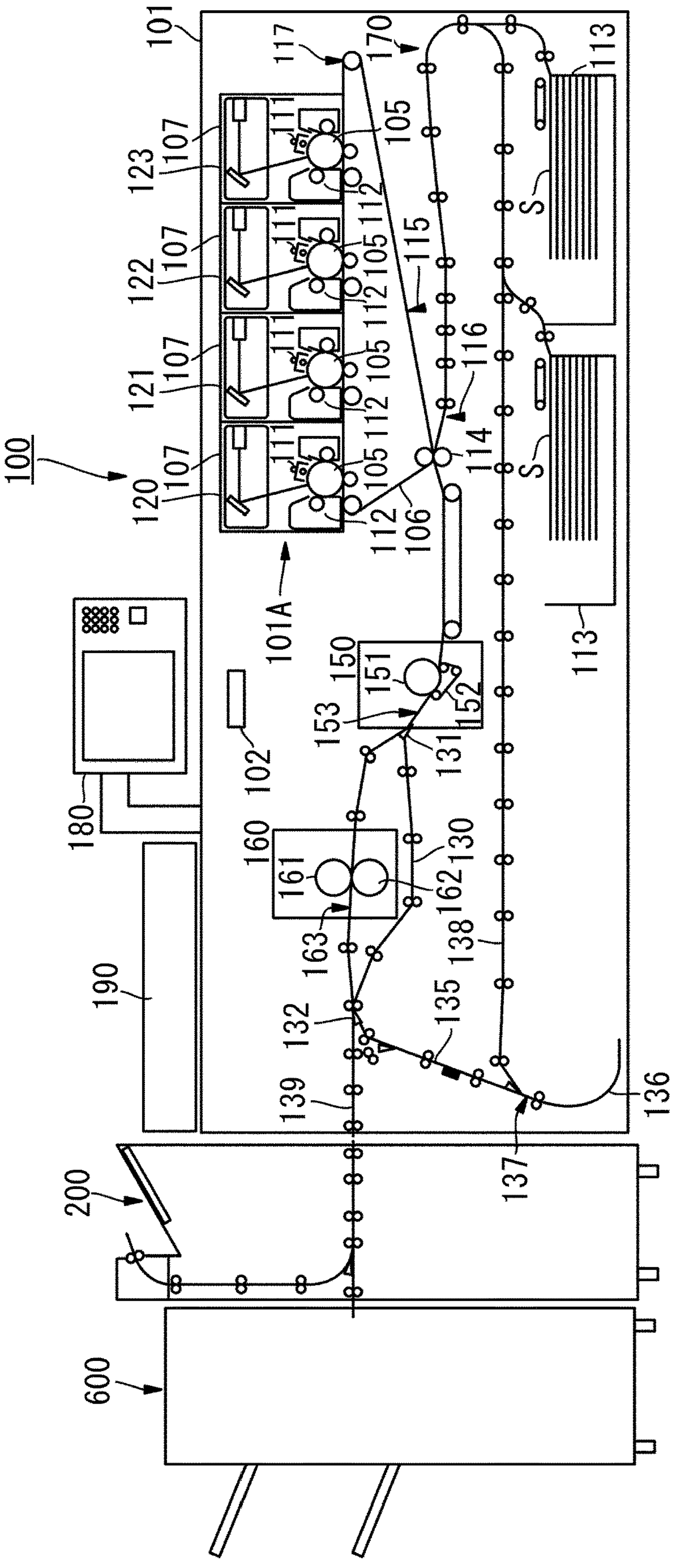
FIG. 1 is a schematic structural view of an image forming apparatus in an embodiment 1 of the present invention.

FIG. 1 is a schematic structural view of a printer 100 of an embodiment 1. The printer 100 includes an image forming unit 101 as an image forming apparatus of this embodiment, an adjusting unit 200, and a post-processing unit 600. The image forming unit 101 includes an engine portion 101A for carrying out image forming processing of the printer 100, a first portion 150 and a second fixing portion 160 which fix a toner image on a sheet S, a feeding portion 113 for feeding the sheet S, and a conveying portion 170 for conveying the sheet S. The image forming unit 101 further includes a controller 102 capable of controlling the engine portion 101A, the first fixing portion 150, the second fixing portion 160, the feeding portion 113, and the conveying portion 170, and includes an operating portion 180 operated by a user for executing the image forming process and for making various settings.

The engine portion 101A has a constitution including a Y (yellow) station 120, an M (magenta) station 121, a C (cyan) 122, and a K (black) station 123 and capable of outputting a full-color image. The Y station 120, the M station 121, the C station 122, and the K station 123 have a common constitution except that colors of toners are different from each other. Each of the Y station 120, the M station 121, the C station 122, and the K station 123 includes a laser scanner portion 107, a photosensitive drum 105, a primary charger 111, and a developing device 112. In each of the Y station 120, the M station 121, the C station 122, and the K station 123, the photosensitive drum 105 is irradiated with laser light emitted from the laser scanner portion 107 depending on image data supplied from the controller 102. The laser scanner portion 107 causes a semiconductor laser or the like to emit the laser light toward the photosensitive drum 105 through reflection of the laser light by a rotatable polygonal mirror and a reflection mirror. A surface of the photosensitive drum 105 is electrically charged in advance by the primary charger 111 so as to assume a uniform electric charge. Further, by the laser light emitted from the laser scanner portion 107, the surface of the photosensitive drum 105 is exposed, so that an electrostatic latent image depending on the image data is formed. The electrostatic latent image formed on the surface of the photosensitive drum 105 is visualized (developed) into a toner image by the developing device 112. Then, the toner image on the surface of the photosensitive drum 105 is transferred (primary-transferred) onto an intermediary transfer member 106. Thus, toner images of the respective colors of YMCK are successively transferred onto the intermediary transfer member 106, so that a full-color visible image is formed on the intermediary transfer member 106.

The sheet S fed from the feeding portion 113 is conveyed toward a transfer roller 114 by the conveying portion 170. The visible image formed on the intermediary transfer member 106 is transferred (secondary-transferred) onto the sheet S by the transfer roller 114. Incidentally, the photosensitive drum 105 and the developing device 112 are mountable in and dismountable from the image forming unit 101. Further, at a periphery of the intermediary transfer member 106, for image formation, a position detecting sensor 115 for determining a print start position and a timing sensor 116 for detecting feeding timing of the sheet S are provided. Further, at the periphery of the intermediary transfer member 106, a density sensor 117 for measuring a density of a color patch for controlling a toner (image) density is provided. When control of the toner image is carried out by this density sensor 117, density measurement of patches for the colors of YMCK is carried out. The sheet S on which the toner image is transferred by the transfer roller 114 is fed toward the first fixing portion 150. The first fixing portion 150 includes a fixing roller 151 for applying heat to the sheet S, a pressing belt 152 for causing the sheet S to press-contact the fixing roller 151, and a post-fixing sensor 153 for detecting completion of the fixing and fixes the toner image, transferred on the sheet S, on the sheet S by heating and pressure application. The fixing roller 151 includes a heater therein an is constituted so as to not only be rotationally driven but also nip and feed the sheet S in cooperation with the pressing belt 152. The sheet S passed through the first fixing portion 150 is fed toward the second fixing portion 160.

The second fixing portion 160 is disposed downstream of the first fixing portion 150 with respect to a feeding direction of the sheet S and is capable of imparting glossiness to the sheet S on which the toner image is fixed by the first fixing portion 150 or of improving a fixing property. Also, the second fixing portion 160 includes a fixing roller 161, a pressing roller 162, and a post-fixing sensor 163 and is constituted so as to be capable of heating and pressing the sheet S, similarly as the first fixing portion 150. Incidentally, depending on a kind of the sheet S, there is a sheet S which is not required to be pressed and heated. In this case, in order to suppress energy consumption of the printer 100, the sheet S is fed toward a feeding passage 130 without via the second fixing portion 160. The sheet S can be guided to the feeding passage 130 by a switching flap member 131. The sheet S passed through the second fixing portion 160 or the feeding passage 130 is guided to a discharge feeding passage 139 or a reverse feeding passage 135 by a switching flap member 132. The position of the sheet S guided to the reverse feeding passage 135 is detected by a reverse sensor 137, and thereafter, the sheet S is subjected to switch-back by a reversing portion 136. By subjecting the sheet S to the switch-back at the reversing portion 136, the sheet S is put in a state in which a leading end and a trailing end of the sheet S are changed to each other. The thus-reversed sheet S is fed again toward the transfer roller 114 via a double-side this embodiment passage 138, and then a toner image is transferred and fixed on a back surface of the sheet S similarly as in the case of the front surface of the sheet S.

The sheet S on which the toner image is fixed is induced to an adjusting unit 200 and a post-processing unit 600 which are provided downstream of the discharge feeding passage 139 with respect to the feeding direction of the sheet S. Further, the image forming unit 101 includes an automatic original feeding device (hereinafter, referred to as ADF) 190 for reading images by successively feeding and conveying a plurality of sheets S. On a lower surface of the ADF 190, a reading portion (not shown) for reading the image on the sheet S is provided, and on the basis of read information, a copying operation and a scanning operation are performed in the image forming unit 101. An upper-portion structure of the ADF 190 is opened upward, and an object to be read is placed on the reading portion, so that reading of the image can be carried out by the reading portion of the ADF 190.

<General Structure of Adjusting Unit>

Next, with reference to parts (a) and (b) of FIG. 2, a structure of the adjusting unit 200 as an example of a sheet feeding device according to this embodiment will be described. Part (a) of FIG. 2 is a sectional view showing a schematic structure of the adjusting unit 200. The adjusting unit 200 is provided downstream of the image forming unit 101 with respect to the feeding direction of the sheet S (FIG. 1). The adjusting unit 200 includes a through passage 230 along which the sheet S received from the image forming unit 101 is delivered to an apparatus (the post-processing unit 600 in FIG. 1) positioned downstream thereof with respect to the sheet feeding direction, and includes a discharging passage 231 along which the sheet S is discharged to a fixed tray 222.

Here, first, an operation in which the sheet S passes through the through passage 230 will be described. In a state in which the switching flap member 221 faces upward and is on stand-by, a feeding roller pair 201 receives the sheet from the image forming unit 101. The sheet received by the feeding roller pair 201 is successively delivered to feeding roller pairs 202, 203 and 204, and then is discharged by a discharging roller pair 205 to an apparatus positioned downstream of the adjusting unit 200 with respect to the sheet feeding direction.

Next, an operation in which the sheet S passes through the discharging passage 231 will be described. In a state in which the switching flap member 221 faces downward and is on stand-by, the feeding roller pair 201 receives the sheet from the image forming unit 101. The sheet received by the feeding roller pair 201 is successively delivered to the feeding roller pairs 202, 203 and 204, and is passed through above the switching flap member 221 and through the discharging passage 231, and then is discharged to the discharging unit 240 by feeding roller pairs 208 and 209. The sheet fed to the discharging unit 240 is discharged to the fixed tray 222 by a discharging roller pair 243. At that time, images on both surfaces (sides) of the sheet are read by an upper surface reading portion 206 for reading the image on an upper surface of the sheet and a lower surface reading portion 207 for reading the image on a lower surface of the sheet. Depending on the images read by the upper surface reading portion 206 and the lower surface reading portion 207, the printer 100 is capable of adjusting positions where the images are formed on the sheet. The feeding roller pairs 201, 202, 203, 204, 205, 208, and 209 and the discharging roller pair 243 are roller pairs constituting a sheet feeding means in this embodiment.

Further, the adjusting unit 200 is provided with a handle 251 operated for opening the discharging passage 231 when a jam occurs in the discharging unit 240. The handle 251 is disposed so as to be exposed to an outside of the adjusting unit 200 as shown in part (b) of FIG. 2. The adjusting unit 200 is constituted so that a user operates the handle 251 and thus the discharging passage 231 is openable.

<Structure of Discharging Unit>

Next, a structure of the discharging unit 240 provided as a part of the adjusting unit 200 will be described with reference to FIG. 3. FIG. 3 is a sectional view showing the structure of the discharging unit 240. Incidentally, FIG. 3 is the sectional view of the discharging unit 240 as seen in the same direction as the direction in FIG. 2 and is also the sectional view of the discharging unit 240 as seen in an axial direction of the feeding roller pair 243. The discharging unit 240 includes a lower discharging unit 241 provided integrally with an apparatus main assembly 200A of the adjusting unit 200 and an upper discharging unit 242 supported rotatably relative to the apparatus main assembly 200A. The upper discharging unit 242 as a door in this embodiment rotatable relative to the apparatus main assembly 200A includes the handle 251 operatable by the user and a first roller 243B constituting the feeding roller pair 243, and is rotatable about a rotation shaft 244 as a first shaft in this embodiment. The lower discharging unit 241 includes a second roller 243A constituting the feeding roller pair 243 in cooperation with the first roller 243B and includes a damper unit 280. The damper unit 280 is held by a front-side plate 261 (FIG. 4) of the lower discharging unit 241. The damper unit 280 includes a damper gear 246 and a damper 245. The damper gear 246 is a gear rotatably supported by the lower discharging unit 241 and engages with an internal gear 247, and is driven in drive-connection with the damper 245. The damper gear 246 engages with the internal gear 247 which is a rotatable gear rotated by the upper discharging unit 242, and transmits a damper resistance of the damper 245 to the upper discharging unit 242. By this, a rotational speed of the upper discharging unit 242 is suppressed. A damping mechanism in this embodiment is constituted by the damper gear 246, the damper 245 and the internal gear 247.

Further, the upper discharging unit 242 is provided with a hook 249 including a recessed portion 249A engageable with a member such as a shaft. The hook 249 is engaged with a fixed shaft 248 by putting the recessed portion 249A in a state in which the recessed portion 249A is caught by the fixed shaft 248 provided in the apparatus main assembly 200A. The fixed shaft 248 is held by the front-side plate 261 of the apparatus main assembly 200A as shown in FIG. 4. Further, the upper discharging unit 242 is provided with a sheet guiding surface 242A as a second guiding surface, and the lower discharging unit 241 is provided with a sheet guiding surface 241A as a first guiding surface. In the discharging unit 240, when the upper discharging unit 242 is in a closed state relative to the lower discharging unit 241, the sheet guiding surface 241A and the sheet guiding surface 242A oppose to each other, so that the discharging passage 231 which is an example of a feeding passage is formed. A position of the upper discharging unit 242 when the sheet guiding 241A and the sheet guiding surface 242A oppose each other and thus form the discharging passage 231 is a closed position. When the discharging passage 231 is formed by the upper discharging unit 242 and the lower discharging unit 241, the hook 249 is in a state in which the hook 249 is engaged with the fixed shaft 248. By this, in a state in which the discharging passage 231 is formed, the position of the upper discharging unit 242 can be put in an engaged state with the apparatus main assembly 200A. Incidentally, a material of the first guiding portion and the second guiding portion is metal.

FIG. 4 is a perspective view of the discharging unit 240 from which the upper discharging unit 242 (FIG. 3) is omitted as seen from obliquely above. As shown in FIG. 4, the lower discharging unit 241 includes the fixed shaft 248 held by the front-side plate 261 of the apparatus main assembly 200A and a fixed shaft 256 held by a rear-side plate 260. FIG. 5 is a perspective view showing, as an example, an engaging means 290 for putting the position of the upper discharging unit 242 in the engaged state with the apparatus main assembly 200A. The engaging means 290 includes the handle 251 as an operating member capable of being operated by the user and includes the fixed shafts 248 and 256 as shaft members provided in the apparatus main assembly 200A. Further, the engaging means 290 includes hooks 249 and 254, as hooking members in this embodiment, provided with recessed portions 249A and 254A engageable with the fixed shafts 248 and 256, respectively. The engaging means 290 includes a supporting shaft 253 fixing and supporting the hooks 249 and 254 and includes springs 252 and 255 for urging the recessed portions 249A and 254A of the hooks 249 and 254 toward the fixed shafts 248 and 256, respectively. The hooks 249 and 254 are constituted so as to be movable in interrelation with rotation of the supporting shaft 253.

The handle 251 is drive-connected with the supporting shaft 253 and is disposed so as to be exposed to an outside of the upper discharging unit 242. The supporting shaft 253 is rotatably supported by the upper discharging unit 242, and by operating the handle 251 in a direction of an arrow shown in FIG. 5, the supporting shaft 253 is rotated in a direction opposite to an urging direction of the springs 252 and 255. By this, the hooks 249 and 254 are moved, so that engagement between the fixed shaft 248 and the hook 249 and between the fixed shaft 256 and the hook 254. That is, the handle 251 is a member capable of releasing the engagement between the fixed shaft 248 and the hook 249 and between the fixed shaft 256 and the hook 254 by being operated in the direction opposite to the urging direction of the springs 252 and 255. Incidentally, when the upper discharging unit 242 is displaced from an open state to a closed state relative to the apparatus main assembly 200A, free ends of the hooks 249 and 254 contact the fixed shafts 248 and 256, respectively, so that the springs 252 and 255 are elastically deformed. Further, by elastic deformation of the springs 252 and 255, resistances of the springs 252 and 255 are imparted to the upper discharging unit 242. Further, by elastic deformation of the springs 252 and 255, the free ends of the hooks 249 and 254 are guided to engaging positions where the recessed portions 249A and 254A are engageable with the fixed shafts 248 and 256, respectively. An example of an elastic portion in this embodiment is the springs 252 and 255, and the springs 252 and 255 urge the hooks 249 and 254 in directions in which the hooks 249 and 254 engage with the fixed shafts 248 and 256. Directions of the hooks 249 and 254 engageable with the fixed shafts 248 and 256 are an example of movement directions of the hooks 249 and 254.

Further, a state in which the upper discharging unit 242 is open relative to the apparatus main assembly 200A is a state in which the discharging passage 231 formed by the upper discharging unit 242 and the lower discharging unit 241 is opened. Incidentally, as a constitution in which the upper discharging unit 242 and the apparatus main assembly 200A are put in the engaged state in a state in which the discharging passage 231 is formed, a constitution in which other than the hooks 249 and 254 as engaging portions and the fixed shafts 248 and 256 as portions-to-be-engaged may also be used. For example, a constitution in which a snap-fitting member as an example of the engaging portion elastically deformable is provided on either one of the upper discharging unit 242 and the apparatus main assembly 200A and in which a receiving portion as an example of the portion-to-be-engaged engageable with the snap-fitting member is provided on the other member is provided may also be employed.

Next, by successively making reference to parts (a) to (d) of FIG. 6, a relationship between moment actable around the rotation shaft 244 by a self-weight of the upper discharging unit 242 and a resultant force of a damper resistance of the damper unit 280 and a resisting force of the engaging means 290 will be described. Incidentally, in parts (a) to (d) of FIG. 6, the damper 245 is omitted from illustration. Further, in parts (a) to (d) of FIG. 6, a vertical direction passing through the rotation shaft 244 is indicated by a chain line Z.

The upper discharging unit 242 is rotated from a state (FIG. 3) in which the sheet guiding surface 241A and the sheet guiding surface 242A oppose each other and form the discharging passage 231, in a direction (X1 direction in part (a) of FIG. 6) in which the upper discharging unit 242 is opened relative to the apparatus main assembly 200A. A first direction in this embodiment is a rotational direction of the upper discharging unit 242 when the upper discharging unit 242 is opened relative to the apparatus main assembly 200A and is the X1 direction in part (a) of FIG. 6. The upper discharging unit 242 is capable of being displaced by being rotated in the X1 direction until center of gravity G thereof passes through above the rotation shaft 244 with respect to the vertical direction and the upper discharging unit 242 contacts the fixed tray 233 (FIG. 2). Part (a) of FIG. 6 is a sectional view of the discharging unit 240 when the upper discharging unit 242 is rotated relative to the apparatus main assembly 200A in the X1 direction until the upper discharging unit 242 contacts the fixed tray 233. Further, the upper discharging unit 242 is capable of being on stand-by while being kept in a state in which the discharging passage 231 is opened at a position when the upper discharging unit 242 contacts the fixed tray 233. Part (a) of FIG. 6 shows a position of the upper discharging unit 242 in the discharging unit 240 in the state in which the discharging passage 231 is opened at the position where the upper discharging unit 242 contacts the fixed tray 233. The position of the upper discharging unit 242 in the state in which the discharging passage 231 is opened at the position where the upper discharging unit 242 contacts the fixed tray 233 is an example of the open position in this embodiment. Incidentally, at this time, the center of gravity G of the upper discharging unit 242 is in a position where the center of gravity G passes in the X1 direction through above the rotation shaft 244 with respect to the vertical direction. Further, a self-weight W of the upper discharging unit 242 is supported by the fixed tray 233, and therefore, the upper discharging unit 242 is caused to be on stand-by in the state shown in part (a) of FIG. 6, so that it is possible to remove a jammed sheet or the like.

Part (b) of FIG. 6 is a sectional view of the discharging unit 240 when the upper discharging unit 242 is rotated about 35 degrees from a state of part (a) of FIG. 6 in a direction in which the discharging passage 231 is formed, i.e., in a direction in which the upper discharging unit 242 is closed relative to the apparatus main assembly 200A. A second direction in this embodiment is a rotational direction of the upper discharging unit 242 when the upper discharging unit 242 is closed relative to the apparatus main assembly 200A and is an X2 direction in part (b) of FIG. 6. The X2 direction is a direction opposite to the X1 direction in part (a) of FIG. 6. In this embodiment, a damper resistance F1 of the damper unit 280 is imparted to the upper discharging unit 242. The damper resistance F1 is a resisting force resisting the rotation of the upper discharging unit 242, and a first resisting force in this embodiment is the damper resistance F1 imparted to the upper discharging unit 242 by the damper unit 280. In part (b) of FIG. 6, a state of the upper discharging unit 242 when the center of gravity G of the upper discharging unit 242 is positioned above the rotation shaft 244 with respect to the vertical direction is shown. Further, the damper resistance F1 is set so as to be equal to or larger than the moment actable around the rotation shaft 244 by the self-weight W of the upper discharging unit 242. Although the upper discharging unit 242 is rotatable in the X2 direction by the moment acting around the rotation shaft 244 by the self-weight W of the upper discharging unit 242, the rotation thereof is suppressed by the damper resistance F1 imparted by the damper unit 280. That is, in the state shown in part (b) of FIG. 6, the upper discharging unit 242 can be caused to be on stand-by so as not to rotate in the X2 direction. A first position in this embodiment is a position of the center of gravity G of the upper discharging unit 242 positioned above the rotation shaft 244 with respect to the vertical direction. For that reason, when the user operates the upper discharging unit 242, it is possible to prevent that the upper discharging unit 242 starts to rotate against a user's intention. Incidentally, a position of the upper discharging unit 242 when the position of the center of gravity G is above the rotation shaft 244 with respect to the vertical direction corresponds to a top dead center of the upper discharging unit 242.

Part (c) of FIG. 6 is a sectional view of the discharging unit 240 when the upper discharging unit 242 is rotated about 5 to 10 degrees from a state of part (b) of FIG. 6 in a direction. In part (c) of FIG. 6, a state of the upper discharging unit 242 when the center of gravity G of the upper discharging unit 242 is positioned on a downstream side of the X2 direction than when the center of gravity G is positioned above the rotation shaft 244 with respect to the vertical direction is shown. Here, the moment acting around the rotation shaft 244 by the self-weight W of the upper discharging unit 242 increases with rotation of the upper discharging unit 242 from the state of part (b) of FIG. 6 in the X2 direction. In this embodiment, when the upper discharging unit 242 is in the position shown in part (c) of FIG. 6, the damper resistance F1 is set so that the moment acting around the rotation shaft 244 by the self-weight W of the upper discharging unit is larger than the damper resistance F1. That is, in this embodiment, the damper resistance F1 is set so that the moment acting around the rotation shaft 244 by the self-weight W of the upper discharging unit 242 in the case where the center of gravity G passes through a position downstream, with respect to the X2 direction, of a position above the rotation shaft 244 with respect to the vertical direction. For that reason, when the user operates the upper discharging unit 242, by closing the upper discharging unit 242 to the position of part (c) of FIG. 6, the upper discharging unit 242 is rotated in the X2 direction by the moment acting around the rotation shaft 244 by the self-weight W of the upper discharging unit 242. A second position in this embodiment is a position of the center of gravity G of the upper discharging unit 242 positioned on the downstream side of the X2 direction than when the center of gravity G is positioned above the rotation shaft 244 with respect to the vertical direction. Accordingly, when the user closes the upper discharging unit 242, it is possible to suppress an amount of a stroke operated by the user and to improve an operating property. Incidentally, a position of the upper discharging unit 242 when the position of the center of gravity G is positioned on the downstream side of the X2 direction than when the center of gravity G is positioned above the rotation shaft 244 with respect to the vertical direction corresponds to a position rotated about 5 to 10 degrees from the top dead center of the upper discharging unit 242.

Part (d) of FIG. 6 is a sectional view of the damper unit 240 when the upper discharging unit 242 is rotated in the X2 direction and the hook 249 contacts the fixed shaft 248. Part (d) of FIG. 6 is the sectional view of the device 240 as seen in an axial direction of the rotation shaft 244, and shows the hook 249 and the fixed shaft 248 which are provided at one end portion of the engaging means 290 with respect to the axial direction. When the upper discharging unit 242 is rotated in the X2 direction and the hook 249 contacts the fixed shaft 248, the spring 252 starts to be elastically deformed. A third position in this embodiment is a position of the center of gravity G of the upper discharging unit 242 when the center of gravity G is positioned on a further downstream side of the X2 direction than the position of the center of gravity G above the rotation shaft 244 with respect to the vertical direction and when the spring 252 start elastic deformation thereof. Further, by the elastic deformation of the spring 252, the resisting force resisting the rotation of the upper discharging unit 242 is imparted from the engaging means 290 to the upper discharging unit 242. A second resisting force in this embodiment is a hook resistance F2 imparted to the upper discharging unit 242 by the engaging means 290. In this embodiment, when the upper discharging unit 242 is in the position shown in part (d) of FIG. 6, a resultant force of the damper resistance F1 and the hook resistance F2 is set so that the moment acting around the rotation shaft 244 by the self-weight W of the upper discharging unit 242 is larger than the resultant force. Here, the hook resistance F2 by the elastic deformation of the spring 252 increases with rotation of the upper discharging unit 242 from the state of part (d) of FIG. 6 in the X2 direction. In a state in which the upper discharging unit 242 is positioned between the position shown in part (d) of FIG. 6 and the close position shown in FIG. 3, the resultant force of the damper resistance F1 and the hook resistance F2 is set so that the moment acting around the rotation shaft 244 by the self-weight W of the upper discharging unit 242 is always larger than the resultant force. By this, the upper discharging unit 242 is rotated in the X2 direction by the moment acting around the rotation shaft 244 by the self-weight W of the upper discharging unit 242. For that reason, when the user operates the upper discharging unit 242, in order to engage the hook 249 with the fixed shaft 248, the user is not required to perform an operation in which the user presses down the upper discharging unit 242. Thus, in this embodiment, only by rotating the upper discharging unit 242 to the position of part (c) of FIG. 6, in the state in which the discharging passage 231 is formed, the position of the upper discharging unit 242 can be put in the engaged state with the apparatus main assembly 200A, and therefore, the operating property can be improved.

In a conventional image forming apparatus, when the door provided with the feeding guides and the damper is opened and closed, in the case where the damper resistance is smaller than the self-weight of the door when the door is intended to be closed from the open state, the door has been unintentionally rotated in the closing direction of the door. Further, in the case where the damper resistance is larger than the self-weight of the door, an amount of a stroke of the door necessary to close the door becomes large, so that there is need to perform an operation in which the door is pressed down and is closed in order to hang the hook on the rotation shaft, so that the operating property is impaired. On the other hand, in this embodiment, by utilizing the resistance of the damper 280, while suppressing a closing speed of the upper discharging unit 242, the user is capable of operating the damper unit 240 in a proper stroke amount. Further, the upper discharging unit 242 and the apparatus main assembly 200A can be putted in the engagement state by utilizing the self-weight W of the upper discharging unit 242, and therefore, it becomes possible to compatibly realize improvement of a damping property of rotation of the upper discharging unit 242 and improvement of an operating property of the upper discharging unit 242.

Further, the upper discharging unit 242 rotatable relative to the apparatus main assembly 200A is provided with the interval gear 247 and the apparatus main assembly 200A is provided with the damper 245 and the damper gear 246 (FIG. 3), and therefore, a space of a housing of the damper 280 can be made small. By this, the discharging unit 240 can be downsized. This is because when the damper and the damper gear are provided in the discharging passage 231, there is a need to offset the housing of the damper unit and a space of the discharging roller pair 243 is reduced. The discharging roller pair 243 is disposed in the neighborhood of the rotation shaft 244, whereby a roller nip pressure when the first roller 243B and the second roller 243A which are spaced from each other contact each other can be prevented from constituting a resistance. Further, as the damper 245 in this embodiment, a unidirectional rotation damper may also be used. In the case where the unidirectional rotation damper is used as the damper 245, the damper unit 280 causes the first resisting force to act on the upper discharging unit 242 when the upper discharging unit 242 is rotated in the X2 direction, and causes a third resisting force smaller than the first resisting force to act on the upper discharging unit 242 when the upper discharging unit 242 is rotated in the X1 direction. By this, the operating property can be improved when the upper discharging unit 242 is rotated in the X1 direction. Incidentally, by disposing the damper 245 at a position spaced from the rotation shaft 244, for example, at a position of about ⅓ to ½ of a distance between the rotation shaft 244 and the center of gravity G, it is possible to cause the damper resistance F1 to efficiently act on the upper discharging unit 242.

Embodiment 2

FIG. 7 is a sectional view showing a structure of a damper unit 240 in an embodiment 2. In FIG. 7, constituent elements similar to those in the embodiment 1 are represented by the same reference numerals or symbols and will be omitted from redundant description. In the damper unit 240 in this embodiment, as a gear engageable with the damper gear 246, a sun gear 347 is provided in place with the internal gear 247 (FIG. 3) in the embodiment 1. The sun gear 347 is a fixed gear fixed and supported by the lower discharging unit 241. Further, in the embodiment 2, the damper gear 246 is rotatably supported by the upper discharging unit 242. Also, in the embodiment 2, the sun gear 347 and the damper gear 246 are engaged with each other, so that the damper resistance is imparted to the upper discharging unit 242 similarly as in the embodiment 1. A damper resistance imparted to the upper discharging unit 242 by engagement of the sun gear 347 and the damper gear 246 is a first resisting force in this embodiment. Also, in the embodiment 2, similarly as in the embodiment 1, it is possible to compatibly realize improvement of the damping property of the upper discharging unit 242 and improvement of the operating property of the upper discharging unit 242.

Other Embodiments

In the embodiments 1 and 2, the printer 100 of the electrophotographic type was described as an example, but similar effects can also be obtained by applying the embodiments 1 and 2 to an ink jet printer, a sublimation printer, and the like. Further, the printer 100 may also be constituted as an image forming apparatus as an example of an image forming system in which the image forming unit 101 and the adjusting unit 200 are assembled into a unit.

As an embodiment other than the embodiments 1 and 2, for example, the upper discharging unit 242 is provided with an overlapping portion or the like, and a magnitude relationship between the damper resistance F1 and the moment acting around the rotation shaft 244 by the self-weight W of the upper discharging unit 242 may also be adjusted or controlled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-089816 filed on May 22, 2020, which is hereby incorporated by reference herein in its entirety.

What is claimed is:

1. A sheet conveying device which receives a sheet from an image forming apparatus and conveys the sheet to a post-processing device, the sheet conveying device comprising:

a through passage through which the sheet conveyed from the image forming apparatus is conveyed to the post-processing device;

a reading sensor provided in the through passage and configured to read an image of the sheet;

a discharging passage extending upward from the through passage;

a discharging roller pair configured to discharge the sheet passed through the discharging passage;

a discharging tray on which the sheet discharged by the discharging roller pair is stacked;

a first guide configured to form the discharging passage; and a door provided with a second guide forming the discharging passage in cooperation with the first guide and configured to be rotatable about a rotation axis between a closed position and an open position, the closed position being a position where the second guide opposes the first guide and forms the discharging passage, and the open position being a position where the discharging passage is open, wherein a center of gravity of the door passes through above the rotation axis while the door moves from the closed position to the open position, and wherein the door rotates in a direction toward the discharging tray while moving from the closed position to the open position, and is positioned over the discharging tray in the open position.

2. A sheet conveying device according to claim 1, wherein the door is supported by the discharging tray in the open position.

3. A sheet conveying device according to claim 1, further comprising a damping mechanism configured to impart a resisting force to the door when the door is rotated from the open position to the closed position.

4. A sheet conveying device according to claim 1, further comprising:

an engaging portion configured to engage with an engaged portion when the door is positioned in the closed position; and a handle configured to release engagement between the engaging portion and the engaged portion by a user.

5. An image forming system comprising:

an image forming apparatus configured to form an image on a sheet;

a sheet conveying device configured to convey the sheet conveyed from the image forming apparatus; and a post-processing device connected downstream of the sheet conveying device, wherein the sheet conveying device includes:

(1) a through passage through which the sheet conveyed from the image forming apparatus is conveyed to the post-processing device;

(2) a reading sensor provided in the through passage and configured to read an image of the sheet;

(3) a discharging passage extending upward from the through passage;

(4) a discharging roller pair configured to discharge the sheet passed through the discharging passage;

(5) a discharging tray on which the sheet discharged by the discharging roller pair is stacked;

(6) a first guide configured to form the discharging passage; and (7) a door provided with a second guide forming the discharging passage in cooperation with the first guide and configured to be rotatable about a rotation axis between a closed position and an open position, the closed position being a position where the second guide opposes the first guide and forms the discharging passage, and the open position being a position where the discharging passage is open, wherein a center of gravity of the door passes through above the rotation axis while the door moves from the closed position to the open position, and wherein the door rotates in a direction toward the discharging tray while moving from the closed position to the open position, and is positioned over the discharging tray in the open position.

6. A sheet conveying device which receives a sheet from an image forming apparatus and conveys the sheet to a post-processing device, the sheet conveying device comprising:

a through passage through which the sheet conveyed from the image forming apparatus is conveyed to the post-processing device;

a reading sensor provided in the through passage and configured to read an image of the sheet;

a first guide;

a door provided with a second guide configured to be rotatable about a rotation axis between a closed position and an open position, the closed position being a position where the second guide opposes the first guide and in cooperation with the first guide forms a discharging passage that extends upward from the through passage, and the open position being a position where the second guide is farther away from the first guide than in the closed position;

a discharging roller pair configured to discharge the sheet passed through the discharging passage; and a discharging tray on which the sheet discharged by the discharging roller pair is stacked, wherein a center of gravity of the door passes above the rotation axis while the door moves from the closed position to the open position, and wherein the door rotates in a direction toward the discharging tray while moving from the closed position to the open position, and is positioned over the discharging tray in the open position.

* * * * *